(12) United States Patent
Matsumoto

(10) Patent No.: US 10,833,470 B2
(45) Date of Patent: Nov. 10, 2020

(54) OPTICAL FIBER AND FIBER LASER

(71) Applicant: FUJIKURA LTD., Tokyo (JP)

(72) Inventor: Ryokichi Matsumoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/339,279

(22) PCT Filed: Sep. 29, 2017

(86) PCT No.: PCT/JP2017/035467
§ 371 (c)(1),
(2) Date: Apr. 3, 2019

(87) PCT Pub. No.: WO2018/066470
PCT Pub. Date: Apr. 12, 2018

(65) Prior Publication Data
US 2019/0237929 A1   Aug. 1, 2019

(30) Foreign Application Priority Data

Oct. 4, 2016   (JP) .................................. 2016-196650

(51) Int. Cl.
*H01S 3/067*   (2006.01)
*H01S 3/094*   (2006.01)
(Continued)

(52) U.S. Cl.
CPC .......... *H01S 3/06716* (2013.01); *G02B 6/036* (2013.01); *G02B 6/255* (2013.01);
(Continued)

(58) Field of Classification Search
CPC ............. H01S 3/06716; H01S 3/06733; H01S 3/094007; H01S 3/0941; H01S 3/0675;
(Continued)

(56) References Cited

U.S. PATENT DOCUMENTS 5,018,824 A * 5/1991 Ooe ..................... G02B 6/2551
219/121.2
5,864,644 A   1/1999 DiGiovanni et al.
(Continued)

FOREIGN PATENT DOCUMENTS

CN   102207591 A   10/2011
CN   103814315 A   5/2014
(Continued)

OTHER PUBLICATIONS

Notice of Allowance issued in Japanese Patent Application No. 2016-196649, dated Jun. 5, 2018 (1 page).
(Continued)

*Primary Examiner* — Armando Rodriguez
(74) *Attorney, Agent, or Firm* — Osha Liang LLP

(57) ABSTRACT

An optical fiber includes: an optical waveguide; and a resin coating that is lower in refractive index than the optical waveguide and covers a side surface of the optical waveguide except in a coating-removed section of the side surface. The coating-removed section of the side surface is covered throughout with an inorganic layer that is lower in refractive index than the optical waveguide.

17 Claims, 4 Drawing Sheets

(51) Int. Cl.
*H01S 3/0941* (2006.01)
*G02B 6/255* (2006.01)
*G02B 6/036* (2006.01)
*H01S 3/17* (2006.01)
*H01S 3/16* (2006.01)

(52) U.S. Cl.
CPC ........ *H01S 3/06733* (2013.01); *H01S 3/0941* (2013.01); *H01S 3/094007* (2013.01); *H01S 3/0675* (2013.01); *H01S 3/094011* (2013.01); *H01S 3/1618* (2013.01); *H01S 3/176* (2013.01)

(58) Field of Classification Search
CPC .. H01S 3/094011; H01S 3/1618; H01S 3/176; G02B 6/036; G02B 6/255
See application file for complete search history.

(56) References Cited

U.S. PATENT DOCUMENTS

| | | |
|---|---|---|
| 2010/0188735 A1 | 7/2010 | Tamaoki |
| 2013/0308661 A1 | 11/2013 | Nishimura et al. |
| 2014/0016656 A1 | 1/2014 | Taya |
| 2015/0062693 A1* | 3/2015 | Fishteyn ............... H01S 3/0407 359/341.1 |
| 2015/0247972 A1 | 9/2015 | Itoh |
| 2016/0291256 A1 | 10/2016 | Rollinger |
| 2016/0336710 A1 | 11/2016 | Tanaka |

FOREIGN PATENT DOCUMENTS

| | | |
|---|---|---|
| CN | 105980897 A | 9/2016 |
| EP | 61278 A1 | 9/1982 |
| EP | 2690724 A2 | 1/2014 |
| EP | 3104201 A1 | 12/2016 |
| EP | 3188327 A1 | 7/2017 |
| GB | 2186992 A | 8/1987 |
| JP | S54074452 A | 6/1979 |
| JP | S57168201 A | 10/1982 |
| JP | S59121625 U | 8/1984 |
| JP | S60-176006 A | 9/1985 |
| JP | H0573202 B2 | 10/1993 |
| JP | H1172629 A | 3/1999 |
| JP | 2005-4127 A | 1/2005 |
| JP | 20089390 A | 1/2008 |
| JP | 2009116076 A | 5/2009 |
| JP | 2011186399 A | 9/2011 |
| JP | 2015014800 A | 1/2015 |
| JP | 2015125362 A | 7/2015 |
| WO | 2007148127 A2 | 12/2007 |
| WO | 2012133557 A1 | 10/2012 |
| WO | 2015115636 A1 | 8/2015 |
| WO | 201631458 A1 | 3/2016 |

OTHER PUBLICATIONS

Notice of Allowance issued in Japanese Patent Application 2016-196650, dated Feb. 6, 2018 (2 pages).

Office Action issued in Japanese Patent Application 2016-196650, dated Nov. 14, 2017 (3 pages).

* cited by examiner

OPTICAL FIBER AND FIBER LASER

TECHNICAL FIELD

The present invention relates to an optical fiber, and relates to a fiber laser including such an optical fiber.

BACKGROUND

In the field of material processing in which metal materials or the like are processed (e.g., cut, welded, shaved), laser processing using laser light has been increasingly used, replacing machining using a blade, a drill, or the like. Laser processing is superior both in processing accuracy and processing speed to machining. As a laser device for use in laser processing, a fiber laser has been attracting attention. The fiber laser is highly energy-efficient, and is capable of providing laser light with high beam qualities (i.e., with small beam diameter and small beam spreading angle).

A fiber laser is a laser device whose amplifying medium is a pump-gain fiber. Examples of the fiber laser include a resonator-type fiber laser and a MOPA (Master Oscillator Power Amplifier)-type fiber laser. As the pump-gain fiber, a double-clad fiber whose core is doped with a rare-earth element such as Yb is used. By introducing pump light into a cladding of the pump-gain fiber, it is possible to oscillate or amplify laser light.

The resonator-type fiber laser and the power amplifier (post amplifier) of a MOPA-type fiber laser use a plurality of laser diodes to generate pump light, and use an optical combiner to combine pump lights generated by the respective laser diodes (see Patent Literatures 1 and 2). The optical combiner is an optical component that includes a plurality of input lead fibers and a single output lead fiber, and serves to combine the lights introduced via the respective input lead fibers and to send out the combined light via the output lead fiber. In the fiber laser, each of the input lead fibers of the optical combiner is connected to a laser diode via a pump fiber, whereas the output lead fiber of the optical combiner is connected to the pump-gain fiber. The optical combiner may have, at its input end, a delivery fiber port for receiving and sending out signal light, in addition to the input lead fibers connected to the pump fibers. The pump lights generated by the respective laser diodes are combined by the optical combiner and then introduced into the cladding of the pump-gain fiber.

The input lead fibers of the optical combiner for pump light (hereinafter referred to as a pump combiner), and the pump fibers that are fusion spliced to the input lead fibers, are each an optical fiber that guides only pump light therethrough. It is common to use, as such an optical fiber, a single-clad fiber constituted by: a core made of quartz glass; a primary coating made of resin and lower in refractive index than the core; and a secondary coating that is higher in refractive index than the core, such that the pump light is guided through the core. Since the core is made of quartz glass, the core is capable of guiding high-power pump light. Furthermore, since the cladding is made of a resin that is significantly different in refractive index from quartz glass, the numerical aperture (hereinafter referred to as NA) of the core is large and thus the pump light from the laser diodes can be efficiently introduced into the core.

On the other hand, the output lead fiber of the pump combiner, and the pump-gain fiber that is fusion spliced to the output lead fiber, are each an optical fiber that guides both the pump light and laser light therethrough. It is common to use, as such an optical fiber, a double-clad fiber constituted by: a core made of quartz glass; a cladding made of quartz glass and lower in refractive index than the core; a primary coating made of resin and lower in refractive index than the cladding; and a secondary coating that is higher in refractive index than the core, such that the laser light is guided through the core and that the pump light is guided through the cladding.

Incidentally, fusion splicing between optical fibers has to be done after removing coatings from an end portion of each fiber. This means that the primary coating and the secondary coating are removed from areas containing the fusion splice points between the input lead fibers and the pump fibers of the pump combiner. Similarly, the primary coating and the secondary coating are removed also from an area containing the fusion splice point between the output lead fiber of the pump combiner and the pump-gain fiber. Furthermore, also when an optical fiber is subjected to some other processing other than fusion splicing, the coating(s) of the optical fiber has to be removed from an area containing the to-be-processed point. For example, in a case of a resonator-type fiber laser, the pump-gain fiber has its opposite ends connected to fiber Bragg gratings. The fiber Bragg gratings are each a double-clad fiber having therein a grating that causes Bragg reflection. From an area containing the grating, the primary coating and the secondary coating are to be removed. Such an area from which the primary coating and the secondary coating have been removed is hereinafter referred to as a "coating-removed section". The coating-removed section borders on two other sections in each of which the primary coating and the secondary coating are left unremoved. Of these two sections, one section that is closer to the light-entrance end than the coating-removed section is referred to as a "first coated section", whereas the other section that is closer to the light-exit end than the coating-removed section is referred to as a "second coated section".

In the coating-removed section, the exposed portion of the optical waveguide (core or cladding) has to be covered with a medium that is lower in refractive index than that optical waveguide. This is because, otherwise, the coating-removed section is not capable of confining light within the optical waveguide. Patent Literature 3 discloses an arrangement in which an exposed portion of an optical waveguide in a coating-removed section is covered with a low-refractive-index resin. Patent Literature 4 discloses an arrangement in which an exposed portion of an optical waveguide in a coating-removed section is covered with air (air cladding).

PATENT LITERATURE

Patent Literature 1

Japanese Patent Application Publication, Tokukaihei, No. 11-72629

Patent Literature 2

Japanese Patent Application Publication, Tokukai, No. 2008-9390

Patent Literature 3

Japanese Examined Patent Application Publication, Tokukohhei, No. 5-73202

Patent Literature 4

Japanese Patent Application Publication, Tokukai, No. 2009-116076

Fiber lasers for use in material processing are strongly demanded to be capable of higher power output, and those which are capable of producing laser light having a power of several kilowatts or greater have been brought to practical use in recent years. Along with this, the temperature of the optical fibers that form a fiber laser rises because of heat generation at the processed point (such as a fusion splice point or an area having a grating formed therein). If the temperature of the processed point exceeds the heat resistant temperature, the processed point may experience certain changes (e.g., the fusion splice point becomes non-transparent, grating is broken). Furthermore, in a pump-gain fiber, heat that is generated when pump light is converted into laser light is also one cause of temperature rise of the pump-gain fiber, and such a cause cannot be ignored.

Especially in a case where the arrangement disclosed in Patent Literature 4 is employed, the exposed portion of the optical waveguide in the coating-removed section is covered with air, which has low thermal conductivity; therefore, most of heat that has been generated in the optical waveguide will remain in the optical waveguide, and thereby raise the temperature of the optical waveguide. This may cause damage to the primary coating and the secondary coating in the coated sections each of which borders on the coating-removed section.

On the other hand, in a case where the arrangement disclosed in Patent Literature 3 is employed, the exposed portion of the optical waveguide in the coating-removed section is covered with a low-refractive-index resin; therefore, most of heat that has been generated in the optical waveguide will be conducted to the low-refractive-index resin, and dissipated outward via the surface of the low-refractive-index resin. This makes it possible to reduce the temperature rise, of the optical waveguide itself, which would occur via the above mechanism. However, in a case where some foreign substance (especially a foreign substance containing an organic material) is present on the surface of the optical waveguide, the temperature of the low-refractive-index resin rapidly rises via another mechanism. Specifically, the foreign substance present on the side surface of the optical waveguide absorbs light that propagates through the optical waveguide, and generates heat. Especially if this foreign substance becomes non-transparent because of carbonization or the like, the quantity of heat generated by the foreign substance rapidly increases. Then, if the foreign substance generates heat, the low-refractive-index resin undergoes local heating at an area around the foreign substance, and the area becomes non-transparent. If this occurs, this non-transparent area of the low-refractive-index layer absorbs light that propagates through the core and generates heat, and the low-refractive-index layer undergoes local heating at another area that is around the foregoing non-transparent area and this another area becomes non-transparent. Such a chain reaction between generating heat and becoming non-transparent will result in a rapid temperature rise of the low-refractive-index resin. This may cause damage to the low-refractive-index resin.

SUMMARY

One or more embodiments of the invention provide an optical fiber arranged such that a temperature rise of the optical waveguide in the coating-removed section is reduced and such that a rapid temperature rise of the outer layer that covers the optical waveguide in the coating-removed section is prevented.

An optical fiber in accordance with one or more embodiments of the present invention includes: an optical waveguide; and a resin coating that is lower in refractive index than the optical waveguide and that covers a side surface of the optical waveguide except in a coating-removed section, throughout the coating-removed section, the side surface of the optical waveguide being covered with an inorganic layer that is lower in refractive index than the optical waveguide.

According to one or more embodiments of the present invention, it is possible to provide an optical fiber arranged such that a temperature rise of the optical waveguide in the coating-removed section is reduced and such that a rapid temperature rise of the outer layer that covers the optical waveguide in the coating-removed section is prevented.

Figure 1:
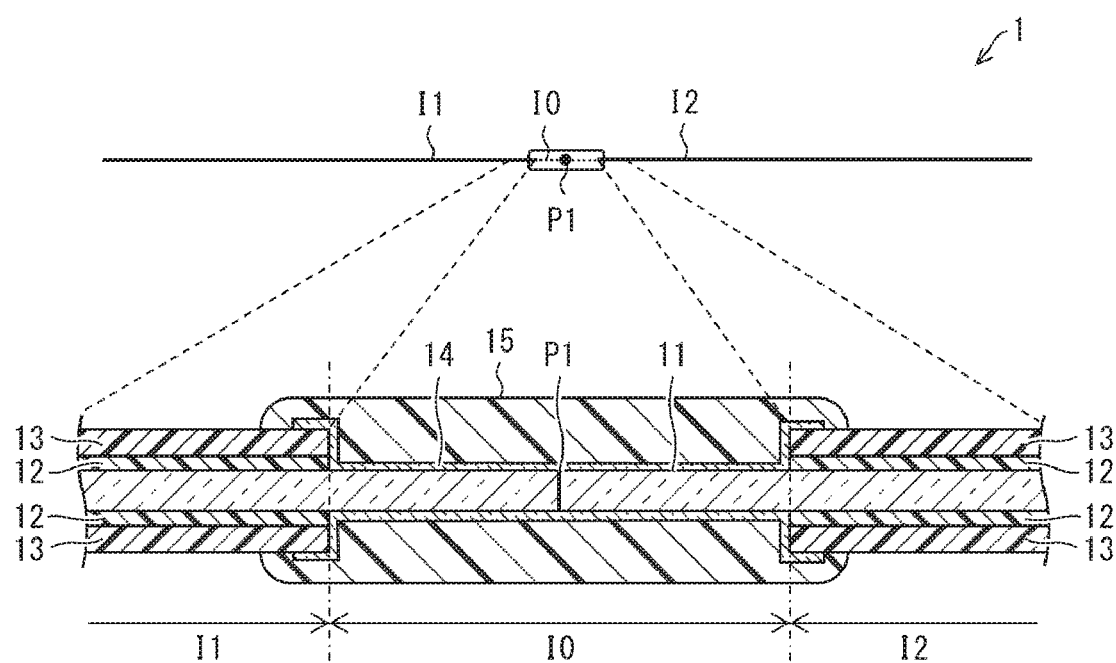
FIG. 1 shows a configuration of an optical fiber in accordance with one or more embodiments of the present invention. The upper part of FIG. 1 schematically illustrates the optical fiber, and the lower part of FIG. 1 is a partial cross-sectional view of the optical fiber.
Figure 2:
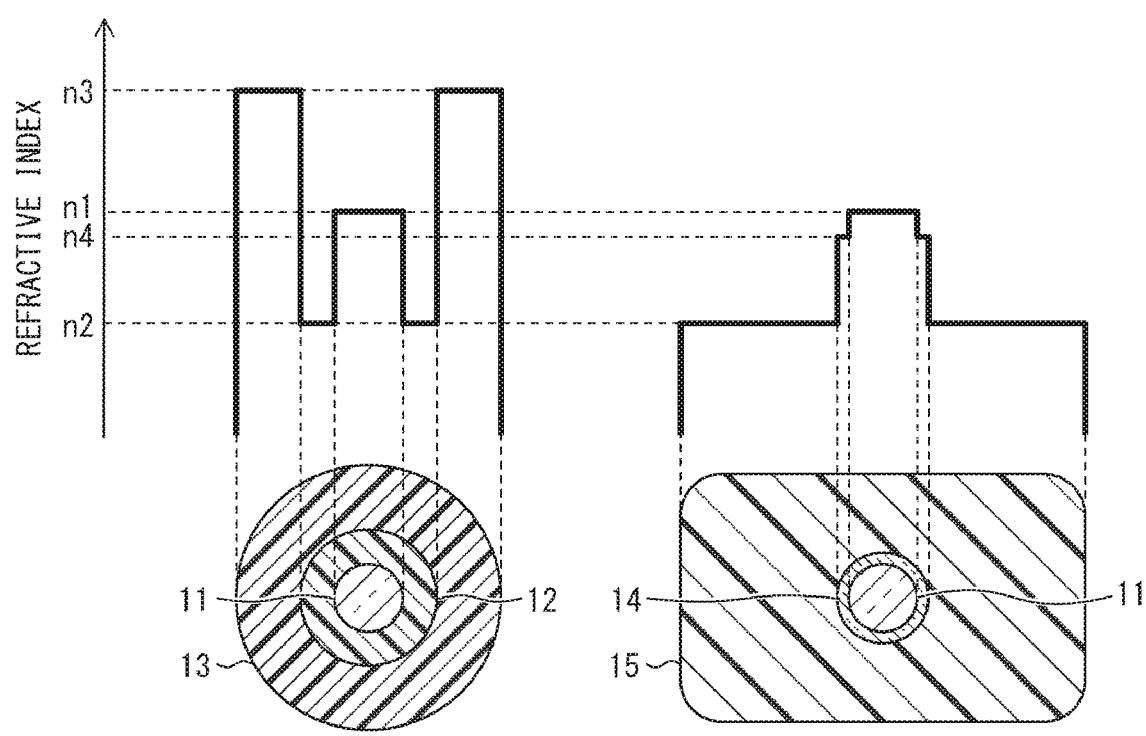

The lower left part of FIG. 2 is a cross-sectional view of a coated section of the optical fiber shown in FIG. 1, and the upper left part of FIG. 2 is a graph showing refractive index distribution in the coated section of the optical fiber. The lower right part of FIG. 2 is a cross-sectional view of a coating-removed section of the optical fiber shown in FIG. 1, and the upper right part of FIG. 2 is a graph showing refractive index distribution in the coating-removed section of the optical fiber.

Figure 3:
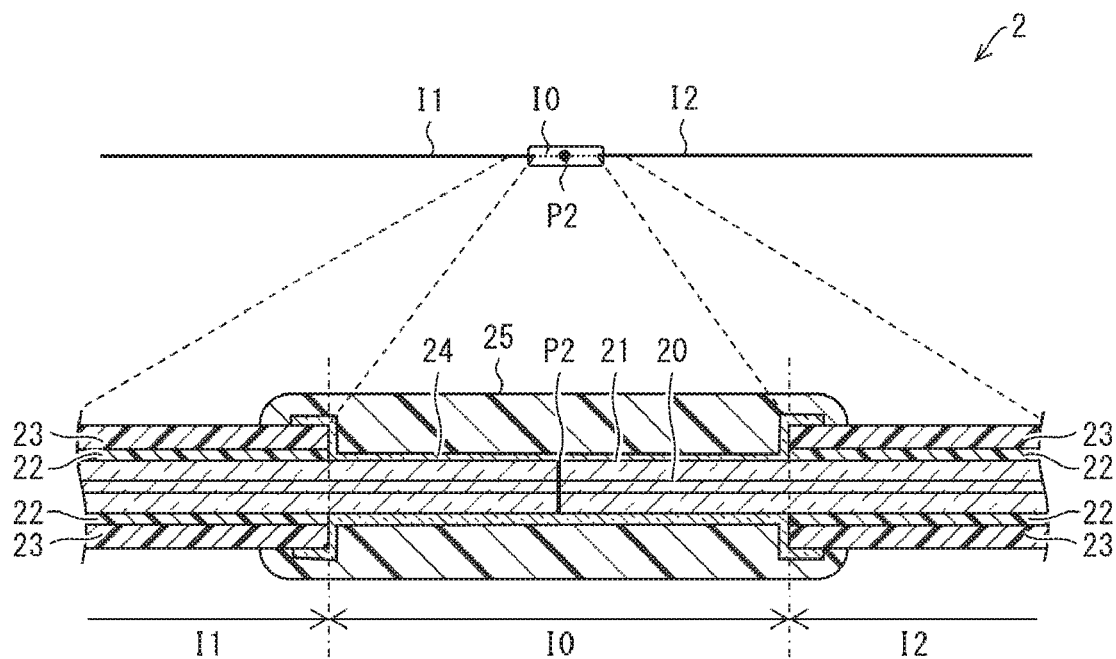

FIG. 3 illustrates a configuration of an optical fiber in accordance with one or more embodiments of the present invention. The upper part of FIG. 3 schematically illustrates the optical fiber, and the lower part of FIG. 3 is a partial cross-sectional view of the optical fiber.

Figure 4:
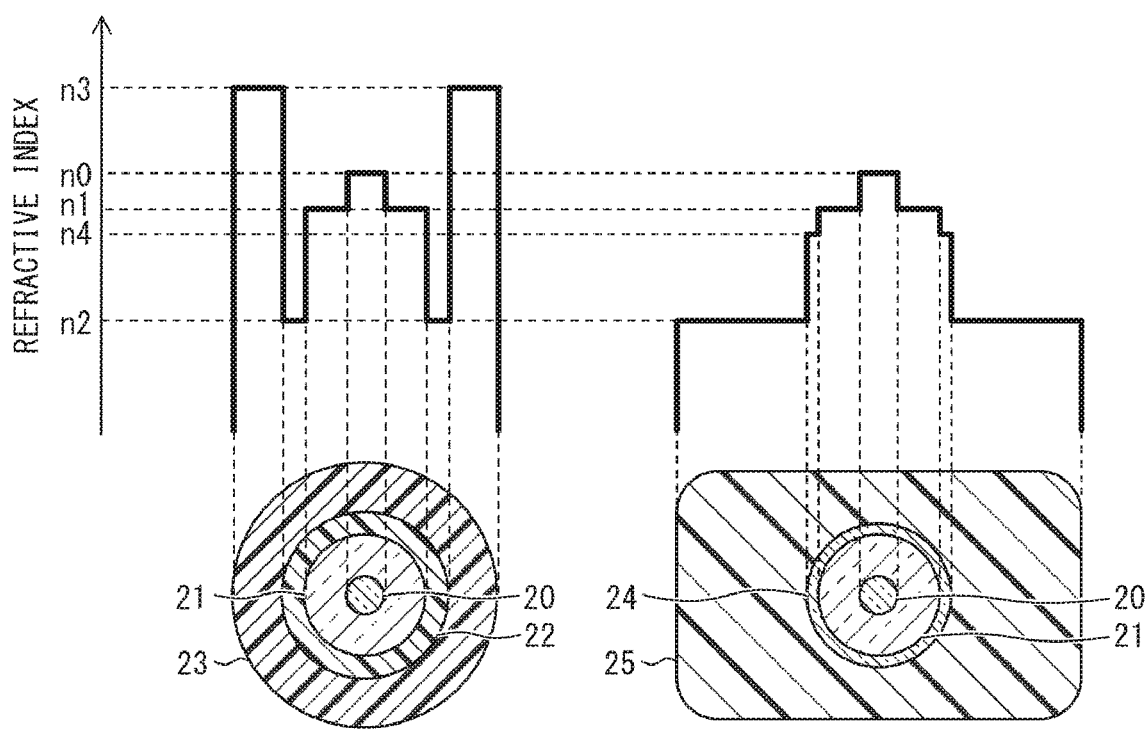

The lower left part of FIG. 4 is a cross-sectional view of a coated section of the optical fiber shown in FIG. 3, and the upper left part of FIG. 4 is a graph showing refractive index distribution in the coated section of the optical fiber. The lower right part of FIG. 4 is a cross-sectional view of a coating-removed section of the optical fiber shown in FIG. 3, and the upper right part of FIG. 4 is a graph showing refractive index distribution in the coating-removed section of the optical fiber.

Figure 5:
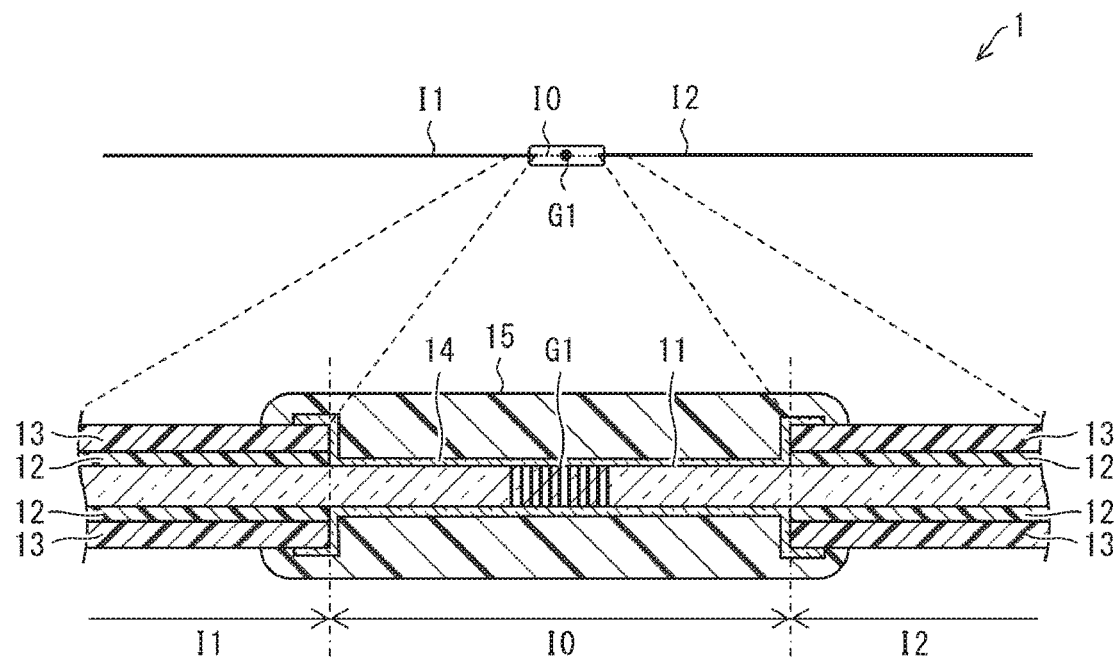

FIG. 5 shows a partial cross-sectional view illustrating one variation of the optical fiber shown in FIG. 1.

Figure 6:
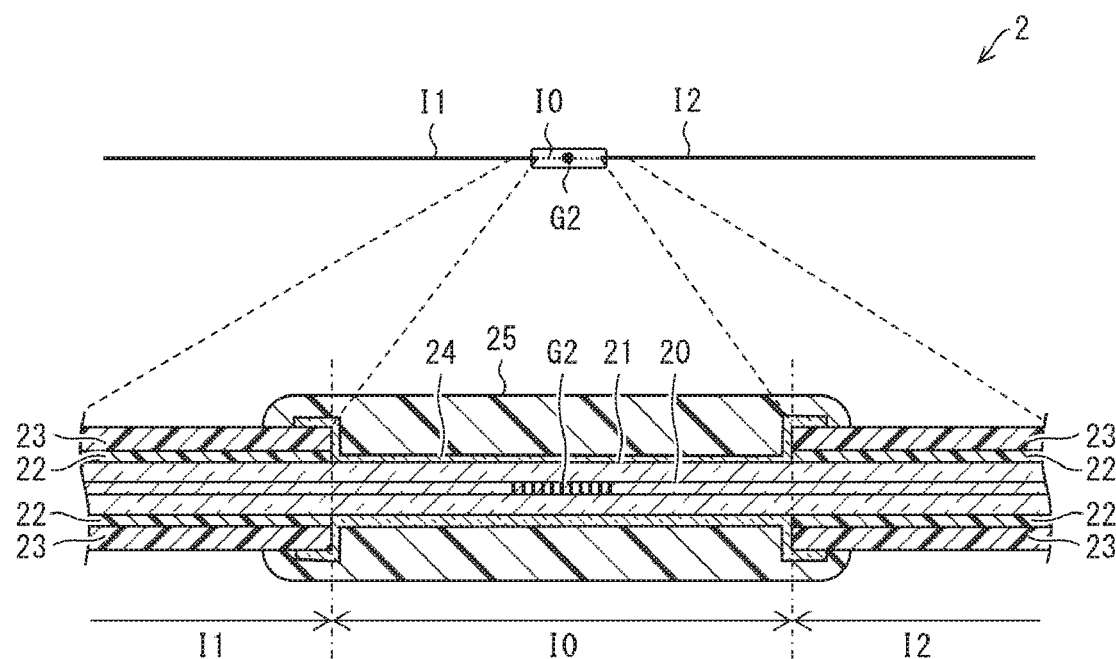

FIG. 6 shows a partial cross-sectional view illustrating one variation of the optical fiber shown in FIG. 3.

Figure 7:
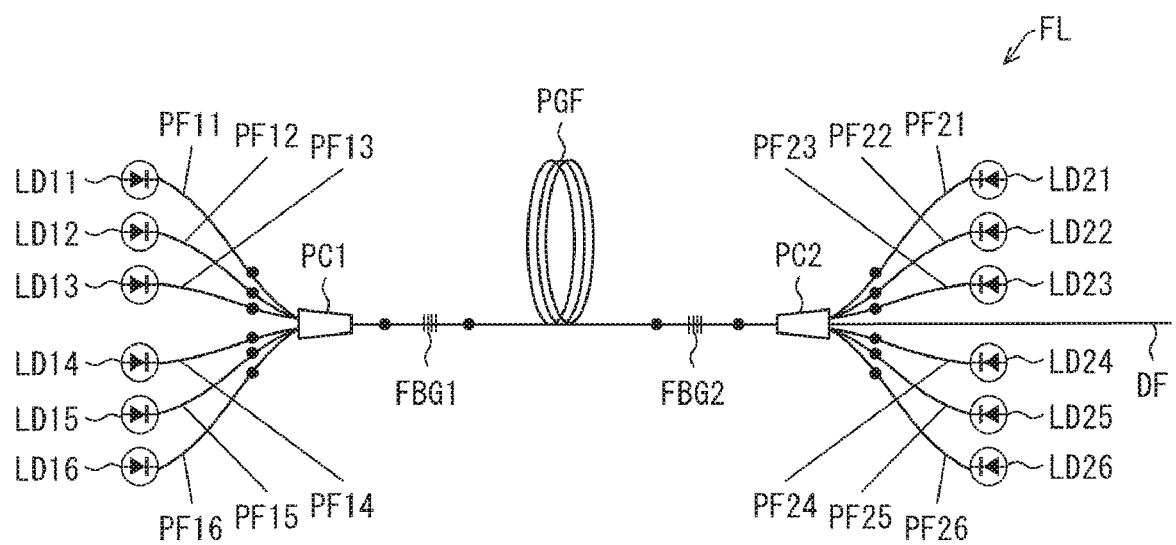

FIG. 7 is a block diagram illustrating a fiber laser that includes the optical fiber shown in FIG. 1 or 3 in accordance with one or more embodiments.

DETAILED DESCRIPTION

[Configuration of Optical Fiber]

The following description will discuss a configuration of an optical fiber 1 in accordance with one or more embodiments of the present invention, with reference to FIGS. 1 and 2. The upper part of FIG. 1 schematically illustrates the optical fiber 1 having a fusion splice point P1 as a processed point, and the lower part of FIG. 1 is an enlarged partial cross-sectional view of a portion containing the fusion splice point P1 of the optical fiber 1. The right part of FIG. 2 shows (i) refractive index distribution of the optical fiber 1 in a coating-removed section I0 that contains the fusion splice point P1 (upper right part) and (ii) a cross-sectional view of the optical fiber 1 in the coating-removed section I0 (lower right part). The left part of FIG. 2 shows (i) refractive index distribution in coated sections I1 and I2 bordering on the coating-removed section I0 (upper left part) and (ii) a cross-sectional view of the optical fiber 1 in the coated sections I1 and I2 (lower left part).

As illustrated in the lower part of FIG. 1, the optical fiber 1 includes: a core 11 in the form of a circular rod (the core 11 is one example of the "optical waveguide" recited in the claims); a primary coating 12 that is in the form of a circular tube and that covers the side surface of the core 11 (the primary coating 12 is one example of the "resin coating" recited in the claims); and a secondary coating 13 that is in the form of a circular tube and that covers the outer surface of the primary coating 12 (the secondary coating 13 is one example of the "outer jacket" recited in the claims). The core 11 is made of quartz glass, and the primary coating 12 and the secondary coating 13 are each made of resin. The core 11 has a refractive index n1, the primary coating 12 has a refractive index n2, and the secondary coating 13 has a refractive index n3 such that the refractive index n1, the refractive index n2, and the refractive index n3 satisfy the relationship: n2<n1<n3, as illustrated in the left part of FIG. 2. Specifically, the optical fiber 1 is a single-clad fiber designed to confine light within the core 11 by utilizing the difference between the refractive index n1 of the core 11 made of quartz glass and the refractive index n2 of the primary coating 12 made of resin (such a difference is represented as "n1−n2"). Such an optical fiber 1 is used as, for example, some of the optical fibers constituting a fiber laser which only guide pump light therethrough, that is, pump fibers and input lead fibers of a pump combiner.

The optical fiber 1 is obtained by fusion-splicing end surfaces of two optical fibers each having the foregoing structure. As illustrated in the upper and lower parts of FIG. 1, in the section I0 that contains the fusion splice point P1, the primary coating 12 and the secondary coating 13 have been removed. Such a section I0 is referred to as the "coating-removed section I0" in this specification. The coating-removed section I0 borders on two sections, one of which is referred to as the "first coated section I1" and the other of which is referred to as the "second coated section I2".

The optical fiber 1 is characterized in that a portion, of the side surface of the core 11, which is exposed in the coating-removed section I0 is covered by an inorganic layer 14. The inorganic layer 14 is composed of an inorganic material that (1) is higher in transmittance than the secondary coating 13 (e.g., has a transmittance of not less than 97%/mm) at the wavelength of light propagating through the core 11 and (2) has a refractive index n4 that is lower than the refractive index n1 of the core 11 as illustrated in the right part of FIG. 2. Because of these characteristics, the optical fiber 1 brings about the following effects.

The first effect is as follows: a temperature rise of the optical fiber 1 in the coating-removed section I0 is reduced. In a case where the exposed portion of the side surface of the core 11 in the coating-removed section I0 is left exposed without coverage by the inorganic layer 14, the result is that this portion of the side surface of the core 11 is covered with a gas that has low thermal conductivity, such as air. Therefore, most of heat that has been generated in the optical fiber 1 will remain in the optical fiber 1, and thereby raise the temperature of the optical fiber 1. This may cause damage to the primary coating 12 and the secondary coating 13 in the coated sections I1 and I2, each of which borders on the coating-removed section W. On the other hand, in a case where the exposed portion of the side surface of the core 11 in the coating-removed section I0 is covered with the inorganic layer 14, most of the heat that has been generated in the optical fiber 1 will be less likely to remain in the optical fiber 1 and more likely to be conducted to the inorganic layer 14. Thus, the temperature rise of the optical fiber 1 is smaller in cases where the exposed portion of the side surface of the core 11 is covered with the inorganic layer 14 than in cases where the exposed portion of the side surface of the core 11 is left exposed without coverage by the inorganic layer 14.

The inorganic layer 14 is covered with an outer layer 15 that (1) is transparent at the wavelength of light propagating through the core 11, (2) has a refractive index that is lower than the refractive index n4 of the inorganic layer 14, and (3) has thermal conductivity. Therefore, heat conducted from the optical fiber 1 to the inorganic layer 14 is then conducted from the inorganic layer 14 to the outer layer 15, and is dissipated outward through the surface of the outer layer 15. This makes it possible to further reduce the temperature rise of the optical fiber 1 in the coating-removed section I0.

The second effect is follows: a rapid temperature rise, of the outer layer 15, which would result from a foreign substance present on the side surface of the core 11 in the coating-removed section I0 is prevented. The foreign substance present on the side surface of the core 11 absorbs light that propagates through the core 11 and generates heat. Especially in a case where the foreign substance becomes less transparent because of carbonization or the like, the quantity of heat generated by the foreign substance rapidly increases. In a case where the side surface of the core 11 in the coating-removed section I0 is covered with the outer layer 15 (which contains organic matter) without having the inorganic layer 14 interposed between the side surface of the core 11 and the outer layer 15, if the foreign substance on the side surface of the core 11 generates heat, the outer layer 15 undergoes local heating at an area around the foreign substance, and the area becomes non-transparent. If this occurs, the non-transparent area of the outer layer 15 absorbs light that propagates through the core 11 and generates heat, and the outer layer 15 undergoes local heating at another area that is around the foregoing non-transparent area, and this another area becomes non-transparent. Such a chain reaction between generating heat and becoming non-transparent will result in a rapid temperature rise of the outer layer 15. This may cause damage to the outer layer 15. On the other hand, in a case where the side surface of the core 11 in the coating-removed section I0 is covered with the inorganic layer 14, even if the foreign substance on the side surface of the core 11 generates heat, the heat is diffused within the inorganic layer 14, and therefore the outer layer 15 (which contains organic matter) does not undergo local heating and thus does not become non-transparent. This makes it possible to prevent a rapid temperature rise, of the outer layer 15, which would otherwise result from a chain reaction between generating heat and becoming non-transparent.

In one or more embodiments, the outer layer 15 is higher in thermal conductivity than the primary coating 12 and the secondary coating 13. This makes it possible to allow heat generated by the primary coating 12 and the secondary coating 13 or heat conducted to the primary coating 12 and the secondary coating 13 to escape to the outer layer 15. As such, heat conducted through the optical fiber 1 (i.e., through the primary coating 12 and/or the secondary coating 13) decreases, and therefore the heat is less likely to be conducted through the primary coating 12 and/or the secondary coating 13. This makes it possible to reduce the temperature rise of the primary coating 12 and the secondary coating 13.

[Thickness of Inorganic Layer]

The thickness of the inorganic layer 14, which covers the side surface of the core 11 in the coating-removed section I0, needs only be equal to or greater than a thickness that is necessary to confine light within the core 11. The inorganic layer 14's thickness that is necessary to confine light within the core 11 becomes smaller as the difference between the refractive index n1 of the core 11 and the refractive index n4 of the inorganic layer 14 becomes greater.

For example, in a case where the refractive index n1 of the core 11 is 1.45 and the refractive index n4 of the inorganic layer 14 is 1.38, the inorganic layer 14's thickness that is necessary to confine light within the core 11 is about 5 µm. Therefore, the thickness of the inorganic layer 14, which covers the side surface of the core 11 in the coating-removed section I0, is set to 5 µm or greater. Alternatively, in a case where the refractive index n1 of the core 11 is 1.45 and the refractive index n4 of the inorganic layer 14 is 1.30 (for example, in a case where the inorganic layer 14 is a particle layer constituted by deposited hollow silica particles, as will be described later), the inorganic layer 14's thickness that is necessary to confine light within the core 11 is about 2 µm. Therefore, the thickness of the inorganic layer 14, which covers the side surface of the core 11 in the coating-removed section I0, is set to 2 µm or greater.

As such, in cases where the thickness of the inorganic layer 14 is set such that the thickens is equal to or greater than a thickness that is necessary to confine light within the core 11, it is possible to prevent or reduce the likelihood that light propagating through the core 11 will enter the outer layer 15 which covers the inorganic layer 14. Accordingly, the outer layer 15 which covers the inorganic layer 14 may be non-transparent at the wavelength of light propagating through the core 11, may have a higher refractive index than the refractive index n4 of the inorganic layer 14, and may contain organic matter. Note, however, that in a case where the outer layer 15 contains organic matter, the thickness of the inorganic layer 14 may be sufficiently thick in order to keep the temperature of the outer layer 15 below the temperature at which the organic matter becomes non-transparent.

[Material for Inorganic Layer]

The inorganic layer 14 may be composed of any inorganic material, provided that the inorganic material is transparent at the wavelength of light propagating through the core 11 and has a refractive index n4 which is lower than the refractive index n1 of the core 11.

For example, the following arrangement may be employed: the side surface of the core 11 in the coating-removed section I0 is covered with a glass that has a refractive index n4 which is lower than the refractive index n1 of the core 11; and this glass is used as the inorganic layer 14 (see Patent Literature 4). Note, however, that, since the optical fiber 1 is a polymer-clad fiber, it is difficult for the optical fiber 1 to employ such an arrangement, for the following reason. In order to produce an optical fiber 1 that employs such an arrangement, it is necessary to carry out a process of coating the side surface of the core 11 with a molten glass in the coating-removed section I0; however, in carrying out this process, it is difficult to keep the temperature of the primary coating 12 and the secondary coating 13 at or below the heat resistant temperature in the coated sections I1 and I2 bordering on the coating-removed section I0. Note that, if a glass having a low melting point is used, it is possible to carry out the above process while keeping the temperature of the primary coating 12 and the secondary coating 13 at or below the heat resistant temperature; however, every known glass having a melting point lower than the heat resistant temperature of the primary coating 12 and the secondary coating 13 is a glass which has a refractive index greater than 1.4. Therefore, in this case, the relative refractive index difference between the core 11 and the inorganic layer 14 (the relative refractive index difference is represented as (n1−n4)/n4) is extremely small, and this makes it impossible to achieve a sufficiently large (to the extent that light leakage from the core 11 into the inorganic layer 14 would be prevented) NA of the core 11 in the coating-removed section I0.

In one or more embodiments, a particle layer that is formed by deposited inorganic particles may be employed as the inorganic layer 14. In this case, the inorganic layer 14 which covers the side surface of the core 11 can be formed by: applying, to the side surface of the core 11, a solvent that dissolves inorganic particles therein; and then volatilizing the solvent. With this, the primary coating 12 and the secondary coating 13 are not heated during the formation of the inorganic layer 14, and it is also easy to keep the refractive index of the inorganic layer 14 at or below 1.4.

In one or more embodiments, the particle diameter of the inorganic particles constituting the inorganic layer 14 is not greater than the wavelength of light that propagates through the core 11, and not greater than ¼ of the wavelength of light that propagates through the core 11. By employing an arrangement in which the particle diameter of the inorganic particles constituting the inorganic layer 14 is not greater than the wavelength of light that propagates through the core 11, it is possible to achieve an inorganic layer 14 that is substantially transparent (transparent at the wavelength of light that propagates through the core 11). Furthermore, by employing an arrangement in which the particle diameter of the inorganic particles constituting the inorganic layer 14 is not greater than ¼ of the wavelength of light that propagates through the core 11, it is possible to further increase the degree of transparency of the inorganic layer 14.

The inorganic layer 14 may be arranged such that, assuming that one of the two sections bordering on the coating-removed section I0 is the first coated section I1 in which the side surface of the core 11 is covered with the primary coating 12 and the secondary coating 13, the NA of the core 11 in the coating-removed section I0 is not less than the minimum value of the NA of the core 11 in the first coated section I1. Specifically, by employing an arrangement in which NA1 min (which is the minimum value of the NA of the core 11 in the first coated section I1) is not greater than NA0 (which is the NA of the core 11 in the coating-removed section I0), it is possible to reduce the likelihood that the light that cannot be confined within the core 11 in the coating-removed section I0 will enter the coating-removed section I0 from the first coated section I1. Such an arrangement is achieved by, for example, bending the optical fiber 1 in the first coated section I1.

In so doing, a minimum bend radius R of the optical fiber 1 in the first coated section I1 may be set as below. Specifically, the NA1 min (which is the minimum value of the NA of the core 11 in the first coated section I1) is given by the following Equation (3), where θbend is defined by the following Equation (1) and θc max is defined by the following Equation (2), assuming that the diameter of the core 11 is D. Therefore, the minimum bend radius R of the optical fiber 1 in the first coated section I1 needs only be set such that the NA1 min, which is given by Equation (3), is less than NA0 (which is the NA of the core 11 in the coating-removed section I0). Note that this arrangement is applicable not only to a single-clad fiber in accordance with one or more embodiments but also to a double-clad fiber which will be described later.

$$\cos(\theta_{bend}) = 1 - \frac{D}{R} \quad (1)$$

$$n_1 \sin(\theta_{cmax}) = \sqrt{n_1^2 - n_2^2} \quad (2)$$

$$NA1_{min} = n_1 \sin(\theta_{cmax} - \theta_{bend}) \quad (3)$$

Furthermore, the refractive index n4 of the inorganic layer 14 may be set such that the relative refractive index difference (n1−n4)/n4 between the core 11 and the inorganic layer 14 is greater than the relative refractive index difference (n1−n2)/n2 between the core 11 and the primary coating 12. Provided that the relative refractive index difference (n1−n4)/n4 between the core 11 and the inorganic layer 14 is greater than the relative refractive index difference (n1−n2)/n2 between the core 11 and the primary coating 12, it is possible to achieve a sufficiently large (to the extent that light leakage from the core 11 into the inorganic layer 14 would be prevented) NA of the core 11 in the coating-removed section I0. This means that the refractive index n4 of the inorganic layer 14 is smaller than the refractive index n2 of the primary coating 12, and therefore the light-confining ability within the core 11 of the coating-removed section I0 is greater than when the refractive index n4 of the inorganic layer 14 is greater than the refractive index n2 of the primary coating 12. Thus, even in a case where there is no bending in a waveguide in the first coated section I1 (which is closer to the light-entrance end), that is, even in a case where light that enters the coating-removed section I0 contains a component that is difficult to confine within the core 11, it is unlikely that light in the coating-removed section I0 would leak from the core 11 into the inorganic layer 14. Note that, by using, as the inorganic layer 14, a particle layer constituted by deposited inorganic particles having a refractive index of not greater than 1.4, such as magnesium fluoride particles or hollow silica particles, it is possible to achieve an arrangement in which the relative refractive index difference (n1−n4)/n4 between the core 11 and the inorganic layer 14 is greater than the relative refractive index difference (n1−n2)/n2 between the core 11 and the primary coating 12, even in a case where the optical fiber 1 is a polymer-clad fiber.

In a case where a particle layer constituted by deposited hollow silica particles is used as the inorganic layer 14, the inorganic layer 14 may have a thickness not greater than 10 μm. This is because, since the hollow silica particles have low thermal conductivity, if the inorganic layer 14 has a thickness greater than 10 μm, the inorganic layer 14 inhibits conduction of heat generated in the optical fiber 1. Note that, in a case where a particle layer constituted by deposited solid (filled) particles is used as the inorganic layer 14, the inorganic layer 14 may have a thickness greater than 10 μm; however, a thicker inorganic layer 14 is more difficult to form, and therefore, in one or more embodiments, the thickness of the inorganic layer 14 is not greater than 100 μm.

Furthermore, regardless of whether the inorganic particles are birefringent, a particle layer constituted by the deposited inorganic particles is not birefringent. This is because the orientation of crystals in the inorganic particles is randomly determined on a particle-by-partible basis. Therefore, a particle layer constituted by deposited inorganic particles that are birefringent can also be suitably used as the inorganic layer 14. Note that examples of inorganic particles that are birefringent include magnesium fluoride particles.

Note that a quartz-based glass layer that is present within an optical fiber can also be used as the inorganic layer 14. Note, however, that it is impossible to allow such a quartz-based glass layer to have a refractive index not greater than 1.4, unless the glass layer contains hollow spaces like a photonic crystal fiber. The use of a glass layer containing hollow spaces as the inorganic layer 14 will cause the following: (1) the optical fiber has a complex structure, and thus is more difficult and more costly to produce; (2) the glass layer extends over the entire length of the optical fiber (for reasons of manufacturing technique, the glass layer is inevitably formed also in a section that does not have any optical reason to form the glass layer, that is, in a section other than the coating-removed section, such as in a lead fiber portion), and therefore the optical fiber has low use efficiency; (3) the optical fiber is large in diameter, and therefore the optical fiber is difficult to manage and it is difficult to carry out processing with respect to the optical fiber (e.g., it is difficult to fusion splice such fibers, it is difficult to form a grating within such an optical fiber); and the like. In contrast, in a case where a particle layer constituted by deposited inorganic particles is used, it is possible to achieve an inorganic layer 14 that has a refractive index not greater than 1.4, without involving above points (1) through (3).

[Verification of Effect]

An optical fiber 1 obtained by fusion-splicing two optical fibers each having the following features was prepared as an Example: the diameter of the core 11 is 0.3 mm, the refractive index n1 of the core 11 is 1.45, the refractive index n2 of the primary coating 12 is 1.36, and the refractive index n3 of the secondary coating 13 is 1.53. Then, in the coating-removed section I0, hollow silica particles having a refractive index of 1.33 and a mean particle diameter of 100 nm were allowed to deposit to form an inorganic layer 14 having a thickness of 5 μm. Furthermore, the surface of the inorganic layer 14 was coated with the outer layer 15, and the surface of the outer layer 15 was brought into contact with a heat radiator.

The following samples of such an optical fiber 1 were prepared: a first sample in which the outer layer 15 is a transparent resin (refractive index: 1.36); a second sample in which the outer layer 15 is a transparent resin (refractive index 1.54); and a third sample in which the outer layer 15 is a white resin, and each sample was measured for its temperature with the use of a thermal imager while introducing light of 1 kW. As a result, it was confirmed that the temperature of each sample rose by 20° C. from when the sample was not receiving the introduction of light. Furthermore, a fourth sample of the above optical fiber 1, in which the outer layer 15 is a transparent resin (refractive index: 1.36) and in which an organic-matter-containing foreign substance about 1 μm in size is present on the side surface of the core 11, was also prepared, and the sample was measured for its temperature with the use of a thermal imager while introducing light of 1 kW. As a result, it was confirmed that also the temperature of this sample rose by 20° C. from when the sample was not receiving the introduction of light.

As Comparative Examples, the following samples were prepared: a fifth sample, a sixth sample, a seventh sample, and an eighth sample, which are the same as the first sample, the second sample, the third sample, and the fourth sample, respectively, except that the fifth to eighth samples each lack the inorganic layer 14. Each of the fifth to eighth samples was measured for its temperature with the use of a thermal imager while increasing the power of introduced light. Note that the fifth to seventh samples are those in which no foreign substance is present, similarly to the first to third samples, whereas the eighth sample is a sample in which an organic-matter-containing foreign substance about 1 μm in size is present on the side surface of the core 11, similarly to the fourth sample.

As a result, it was confirmed that the temperature of the fifth sample, in which the outer layer 15 is a transparent resin (refractive index: 1.36), rose by 20° C. from when the sample was not receiving the introduction of light, similarly to the first sample. On the other hand, in regard to the sixth sample, in which the outer layer 15 is a transparent resin (refractive index: 1.54), and the seventh sample, in which the outer layer 15 is a white resin, their temperature rise exceeded 100° C. before the power of introduced light reached 100 W, and the light transmittance at the fusion splice point P1 decreased to 10% or less. In regard to the eighth sample, in which the outer layer 15 is a transparent resin (refractive index: 1.36) and in which an organic-matter-containing foreign substance about 1 μm in size is present on the side surface of the core 11, a rapid temperature rise was observed, and the evaluation was stopped and the sample was checked at the point in time in which the rapid temperature rise was observed. As a result, it was found that the outer layer 15 became non-transparent.

The above results experimentally demonstrate that, in cases where the outer layer 15 is higher in refractive index than the primary coating 12 (the second sample and the sixth sample), cases where the outer layer 15 is a white resin (the third sample and the seventh sample), and cases where a foreign substance is present on the side surface of the core 11 (the fourth sample and the eighth sample), providing the inorganic layer 14 makes it possible to significantly reduce the temperature rise of the optical fiber 1.

[Configuration of Optical Fiber]

The following description will discuss a configuration of an optical fiber 2 in accordance with one or more embodiments of the present invention, with reference to FIGS. 3 and 4. The upper part of FIG. 3 schematically illustrates the optical fiber 2 which has a fusion splice point P2, and the lower part of FIG. 3 is an enlarged partial cross-sectional view of a portion containing the fusion splice point P2 of the optical fiber 2. The right part of FIG. 4 shows (i) refractive index distribution of the optical fiber 2 in a coating-removed section I0 containing the fusion splice point (upper right part) and (ii) a cross-sectional view of the optical fiber 2 in the coating-removed section I0 (lower right part). The left part of FIG. 4 shows (i) refractive index distribution in coated sections I1 to I2 bordering on the coating-removed section I0 (upper left part) and (ii) a cross-sectional view of the optical fiber 2 in the coated sections I1 to I2 (lower left part). Note that the optical fiber 1 in accordance with one or more embodiments is a fiber obtained by fusion-splicing single-clad fibers with each other, whereas the optical fiber 2 in accordance with one or more embodiments is a fiber obtained by fusion-splicing double-clad fibers with each other.

As illustrated in the lower part of FIG. 3, the optical fiber 2 includes: a core 20 in the form of a circular rod; an inner cladding 21 that is in the form of a circular tube and that covers the side surface of the core 20 (the inner cladding 21 is one example of the "optical waveguide" recited in the claims); an outer cladding 22 that is in the form of a circular tube and that covers the outer surface of the inner cladding 21 (the outer cladding 22 is one example of the "resin coating" recited in the claims); and an outer jacket 23 that is in the form of a circular tube and that covers the outer surface of the outer cladding 22. The core 20 and the inner cladding 21 are each made of quartz glass, and the outer cladding 22 and the outer jacket 23 are each made of resin. The core 20 has a refractive index n0, the inner cladding 21 has a refractive index n1, the outer cladding 22 has a refractive index n2, and the outer jacket 23 has a refractive index n3 such that the refractive index n0, the refractive index n1, the refractive index n2, and the refractive index n3 satisfy the relationship: n2<n1<n0<n3, as illustrated in the left part of FIG. 4. Specifically, the optical fiber 2 is a double-clad fiber designed to confine light within the core 20 by utilizing the difference between the refractive index n0 of the core 20 made of quartz glass and the refractive index n1 of the inner cladding 21 made of quartz glass (such a difference is represented as "n0−n1") and confine light within the inner cladding 21 by utilizing the difference between the refractive index n1 of the inner cladding 21 made of quartz glass and the refractive index n2 of the outer cladding 22 made of resin (such a difference is represented as "n1−n2"). Such an optical fiber 2 is used as, for example, some of the optical fibers constituting a fiber laser which guide laser light and pump light therethrough, that is, a pump-gain fiber and an output lead fiber of a pump combiner.

The optical fiber 2 is obtained by fusion-splicing end surfaces of two optical fibers each having the foregoing structure. As illustrated in the upper and lower parts of FIG. 3, in the section I0 that contains the fusion splice point P2, the outer cladding 22 and the outer jacket 23 have been removed. Such a section I0 is referred to as the "coating-removed section I0" in this specification. The coating-removed section I0 borders on two sections, one of which is referred to as the "first coated section I1" and the other of which is referred to as the "second coated section I2".

The optical fiber 2 is characterized in that a portion, of the side surface of the inner cladding 21, which is exposed in the coating-removed section I0 is covered by an inorganic layer 24. The inorganic layer 24 is composed of an inorganic material that (1) is higher in transmittance than the outer jacket 23 (e.g., has a transmittance of not less than 97%/mm) at the wavelength of light propagating through the inner cladding 21, and (2) has a refractive index n4 that is lower than the refractive index n1 of the inner cladding 21 as illustrated in the right part of FIG. 4. Because of these characteristics, the optical fiber 2 brings about the following effects.

The first effect is as follows: a temperature rise of the optical fiber 2 in the coating-removed section I0 is reduced. In a case where the exposed portion of the side surface of the inner cladding 21 in the coating-removed section I0 is left exposed without coverage by the inorganic layer 24, the result is that this portion of the side surface of the inner cladding 21 is covered with a gas that has low thermal conductivity, such as air. Therefore, most of heat that has been generated in the optical fiber 2 will remain in the optical fiber 2, and thereby raise the temperature of the optical fiber 2. This may cause damage to the outer cladding 22 and the outer jacket 23 in the coated sections I1 and I2, each of which borders on the coating-removed section I0. On the other hand, in a case where the exposed portion of the side surface of the inner cladding 21 in the coating-removed section I0 is covered with the inorganic layer 24, most of the heat that has been generated in the optical fiber 2 will be less likely to remain in the optical fiber 2 and more likely to be conducted to the inorganic layer 24. Thus, the temperature rise of the optical fiber 2 is smaller in cases where the exposed portion of the side surface of the inner cladding 21 is covered with the inorganic layer 24 than in cases where the exposed portion of the side surface of the inner cladding 21 is left exposed without coverage by the inorganic layer 24.

The inorganic layer 24 is covered with an outer layer 15 that (1) is transparent at the wavelength of light propagating through the inner cladding 21, (2) has a refractive index that is lower than the refractive index n4 of the inorganic layer 24, and (3) has thermal conductivity. Therefore, heat conducted from the optical fiber 2 to the inorganic layer 24 is then conducted from the inorganic layer 24 to the outer layer 15, and is dissipated outward through the surface of the outer layer 15. This makes it possible to further reduce the temperature rise of the optical fiber 2 in the coating-removed section W.

The second effect is as follows: a rapid temperature rise, of the outer layer 25, which would result from a foreign substance present on the side surface of the inner cladding 21 in the coating-removed section I0 is prevented. The foreign substance present on the side surface of the inner cladding 21 absorbs light that propagates through the inner cladding 21 and generates heat. Especially in a case where the foreign substance becomes less transparent because of carbonization or the like, the quantity of heat generated by the foreign substance rapidly increases. In a case where the side surface of the inner cladding 21 in the coating-removed section I0 is covered with the outer layer 25 (which contains organic matter) without having the inorganic layer 24 interposed between the side surface of the inner cladding 21 and the outer layer 25, if the foreign substance on the side surface of the inner cladding 21 generates heat, the outer layer 25 undergoes local heating at an area around the foreign substance, and the area becomes non-transparent. If this occurs, the non-transparent area of the outer layer 25 absorbs light that propagates through the inner cladding 21 and generates heat, and the outer layer 25 undergoes local heating at another area that is around the foregoing non-transparent area and this another area becomes non-transparent. Such a chain reaction between generating heat and becoming non-transparent will result in a rapid temperature rise of the outer layer 25. This may cause damage to the outer layer 25. On the other hand, in a case where the side surface of the inner cladding 21 in the coating-removed section I0 is covered with the inorganic layer 24, even if the foreign substance on the side surface of the inner cladding 21 generates heat, the heat is diffused within the inorganic layer 24, and therefore the outer layer 25 (which contains organic matter) does not undergo local heating and thus does not become non-transparent. This makes it possible to prevent a rapid temperature rise, of the outer layer 25, which would otherwise result from a chain reaction between generating heat and becoming non-transparent.

In one or more embodiments, the outer layer 25 is higher in thermal conductivity than the outer cladding 22 and the outer jacket 23. This makes it possible to allow heat generated by the outer cladding 22 and the outer jacket 23 or heat conducted to the outer cladding 22 and the outer jacket 23 to escape to the outer layer 25. This makes it possible to reduce the temperature rise of the outer cladding 22 and the outer jacket 23.

[Thickness of Inorganic Layer and Material for Inorganic Layer]

Values of the thickness of the inorganic layer 24 and options for the material for the inorganic layer 24 of the optical fiber 2 in accordance with one or more embodiments are the same as values of the thickness of the inorganic layer 14 and options for the material for the inorganic layer 14 of the optical fiber 1 in accordance with one or more embodiments (the term "core 11" is read as "inner cladding 21" depending on the context), and therefore their descriptions are omitted here.

[Variations]

The optical fibers 1 and 2 in accordance with one or more embodiments described above are each an optical fiber in which its core 11 or 12 has the fusion splice point P1 or P2 formed therein; however, the present invention is not limited as such. That is, embodiments of the present invention are applicable to any optical fiber in which some processing that necessitates removal of a coating(s) has been done. For example, embodiments of the present invention are applicable to an optical fiber that has a fiber Bragg grating formed therein.

FIG. 5 shows a partial cross-sectional view illustrating one variation of the optical fiber 1 in accordance with one or more embodiments. The optical fiber 1 in accordance with this variation is the same as the optical fiber 1 illustrated in FIG. 1, except that a fiber Bragg grating G1 is provided in place of the fusion splice point P1. The rest of the configuration of the optical fiber 1 in accordance with this variation is the same as that of the optical fiber 1 illustrated in FIG. 1, and thus the descriptions therefor are omitted here.

Similarly to the optical fiber 1 illustrated in FIG. 1, also according to the optical fiber 1 illustrated in FIG. 5, the side surface of the core 11 in the coating-removed section I0 is covered by the inorganic layer 14. This provides an effect of reducing the temperature rise of the optical fiber 1. FIG. 6 shows a partial cross-sectional view illustrating one variation of the optical fiber 2 in accordance with one or more embodiments. The optical fiber 2 in accordance with this variation is the same as the optical fiber 2 illustrated in FIG. 2, except that a fiber Bragg grating G2 is provided in place of the fusion splice point P2. The rest of the configuration of the optical fiber 2 in accordance with this variation is the same as that of the optical fiber 2 illustrated in FIG. 2, and thus the descriptions therefor are omitted here.

Similarly to the optical fiber 2 illustrated in FIG. 3, also according to the optical fiber 2 illustrated in FIG. 6, the side surface of the inner cladding 21 in the coating-removed section I0 is covered by the inorganic layer 24. This makes it possible to reduce the temperature rise of the optical fiber 2.

EXAMPLES OF APPLICATION

Lastly, the following description will discuss examples of application of the optical fibers 1 and 2 in accordance with one or more embodiments described above, with reference to FIG. 7. FIG. 7 schematically illustrates a configuration of a fiber laser FL.

The fiber laser FL is a laser device including, as a resonator, a pump-gain fiber PGF that has fiber Bragg gratings FBG1 and FBG2 connected to the opposite ends thereof. The fiber Bragg grating FBG1, which is on the forward side, is an optical fiber having a grating formed therein which serves as a mirror. The fiber Bragg grating FBG2, which is on the backward side, is an optical fiber having a grating formed therein which serves as a half mirror. The pump-gain fiber PGF used here is a double-clad fiber whose core is doped with a rare-earth element such as Yb. By introducing pump light into a cladding of the pump-gain fiber PGF, it is possible to allow this resonator to oscillate laser light.

In the fiber laser FL, laser diodes LD11 to LD16 and laser diodes LD21 to LD26 are used to generate the pump light, and pump combiners PC1 and PC2 are used to introduce, into the cladding of the pump-gain fiber PGF, the pump light generated by the laser diodes LD11 to LD16 and the laser diodes LD21 to LD26. Each of the pump combiners PC1 and PC2 is an optical component that includes a plurality of input lead fibers and a single output lead fiber. Each of the pump combiners PC1 and PC2 serves to combine lights introduced thereto via the respective input optical fibers and to send out the combined light via the output lead fiber.

The input lead fibers of the pump combiner PC1 are connected to the laser diodes LD1$i$ via pump fibers PF1$i$ ($i$ is 1 to 6), and the output lead fiber of the pump combiner PC1 is connected to one end of the pump-gain fiber PGF via the fiber Bragg grating FBG1. Pump lights generated by the laser diodes LD11 to LD16 are combined by the pump combiner PC1, and the combined light, as forward pump light, is introduced to the cladding of the pump-gain fiber PGF. Similarly, the input lead fibers of the pump combiner PC2 are connected to the laser diodes LD2$j$ via pump fibers PF2$j$ ($j$ is 1 to 6), and the output lead fiber of the pump combiner PC2 is connected to the other end of the pump-gain fiber PGF via the fiber Bragg grating FBG2. Pump lights generated by the laser diodes LD21 to LD26 are combined by the pump combiner PC2, and the combined light, as backward pump light, is introduced to the cladding of the pump-gain fiber PGF. The laser light oscillated in the core of the pump-gain fiber PGF propagates through the core of the fiber Bragg grating FBG2, the core of the output lead fiber of the pump combiner PC2, the core of a delivery fiber port of the pump combiner PC2, and the core of a delivery fiber DF, and then is emitted outward.

In the fiber laser FL, the pump fibers PF11 to PF16, the pump fibers PF21 to PF26, and the input lead fibers of the pump combiners PC1 and PC2 are optical fibers in which the pump light propagates through the cores thereof. It is common to use, as each of these optical fibers, the optical fiber used in one or more embodiments, that is, a single-clad fiber that includes a core made of quartz glass and a primary coating (cladding) made of resin. As such, optical fibers obtained by fusion-splicing the pump fibers PF11 to PF16 with the input lead fibers of the pump combiner PC1, respectively, and optical fibers obtained by fusion-splicing the pump fibers PF21 to PF26 with the input lead fibers of the pump combiner PC2, respectively, are suitable examples of application of the optical fiber 1 in accordance with one or more embodiments (see FIGS. 1 and 2).

On the other hand, in the fiber laser FL, the output lead fibers of the pump combiners PC1 and PC2, the fiber Bragg gratings FBG1 and FBG2, and the pump-gain fiber PGF are optical fibers in which signal light propagates through the cores thereof and pump light propagates through the claddings thereof. It is common to use, as each of these optical fibers, the optical fiber used in one or more embodiments, that is, a double-clad fiber that includes a core made of quartz glass, a cladding made of quartz glass, and a primary coating made of resin. As such, an optical fiber obtained by fusion-splicing these fibers is a suitable example of application of the optical fiber 2 in accordance with one or more embodiments (see FIGS. 3 and 4). Furthermore, each of the pump combiners PC1 and PC2 itself is obtained by fusion-splicing the input lead fibers, which are single-clad fibers (or the delivery fiber DF, which is a double-clad fiber), with the output lead fiber, which is a double-clad fiber, and thus is a suitable Example of the present invention. Furthermore, each of the fiber Bragg gratings FBG1 and FBG2 is a double-clad fiber that has a grating formed therein, and thus is a suitable example of application of the one variation of the optical fiber 2 in accordance with one or more embodiments (see FIG. 6).

Note that optical devices to which the optical fibers 1 and 2 in accordance with one or more embodiments are applicable are not limited to fiber lasers. For example, an optical combiner is also one example of an optical device to which the optical fibers 1 and 2 in accordance with one or more embodiments are applicable.

[Recap]

An optical fiber (1, 2) in accordance with one or more embodiments includes: an optical waveguide (11, 21); and a resin coating (12, 22) that is lower in refractive index than the optical waveguide (11, 21) and that covers a side surface of the optical waveguide (11, 21) except in a coating-removed section (I0), throughout the coating-removed section (I0), the side surface of the optical waveguide (11, 21) being covered with an inorganic layer (14, 24) that is lower in refractive index than the optical waveguide (11, 21).

According to the above arrangement, the optical waveguide (11, 21) in the coating-removed section (I0) is covered with the inorganic layer (14, 24). This makes it possible to keep the temperature rise of the optical waveguide (11, 21) small as compared to cases in which the optical waveguide (11, 21) is covered with a gas. This is because, since the inorganic layer (14, 24) is higher in thermal conductivity than the gas, heat generated in the optical waveguide (11, 21) is less likely to remain in the optical waveguide (11, 21) when the optical waveguide (11, 21) is covered with the inorganic layer (14, 24) than when the optical waveguide (11, 21) is covered with the gas.

Furthermore, according to the above arrangement, since the optical waveguide (11, 21) in the coating-removed section (I0) is covered with the inorganic layer (14, 24), even if a foreign substance present on the side surface of the optical waveguide (11, 21) generates heat, a rapid temperature rise resulting from a chain reaction between generating heat and becoming non-transparent is less likely to occur, unlike the cases where the waveguide is covered with an organic layer such as resin. This is because, although the organic layer is likely to become non-transparent upon receiving heat from the foreign substance, the inorganic layer (14, 24) is less likely to become non-transparent even upon receiving heat from the foreign substance.

The optical fiber (1, 2) in accordance with one or more embodiments may be arranged such that the inorganic layer (14, 24) is covered by an outer layer (15, 25) that is higher in thermal conductivity than the resin coating (12, 22).

According to the above arrangement, heat generated by the resin coating (12, 22) or heat conducted to the resin coating (12, 22) is more likely to escape to the outer layer (15, 25), and thus it is possible to reduce the temperature rise of the resin coating (12, 22).

The optical fiber (1, 2) in accordance with one or more embodiments may further include an outer jacket (13, 23) that covers a side surface of the resin coating (12, 22), and is preferably arranged such that the inorganic layer (14, 24) is covered by an outer layer (15, 25) that is higher in thermal conductivity than the outer jacket (13, 23).

According to the above arrangement, heat generated by the outer jacket (13, 23) or heat conducted to the outer jacket (13, 23) is more likely to escape to the outer layer (15, 25), and thus it is possible to reduce the temperature rise of the outer jacket (13, 23).

The optical fiber (1, 2) in accordance with one or more embodiments may be arranged such that the inorganic layer (14, 24) is a particle layer constituted by inorganic particles deposited in the form of a layer.

According to the above arrangement, it is possible to allow the inorganic layer (14, 24) to have a sufficiently low refractive index. This makes it possible to achieve a sufficiently large (to the extent that light leakage from the optical waveguide (11, 21) into the inorganic layer (14, 24) would be prevented) NA of the optical waveguide (11, 21) in the coating-removed section (I0).

The optical fiber (1, 2) in accordance with one or more embodiments may be arranged such that a particle diameter of the inorganic particles is smaller than a wavelength of light that is guided through the optical waveguide (11, 21).

According to the above arrangement, the inorganic layer (14, 24) is substantially transparent. This makes it possible, even if light leakage from the optical waveguide (11, 21) into the inorganic layer (14, 24) occurs, to eliminate or reduce the likelihood that the inorganic layer (14, 24) will absorb the leaked light and generate heat.

The optical fiber (1, 2) in accordance with one or more embodiments may be arranged such that: the coating-removed section (I0) borders on two sections, one of which is a first coated section (I1) in which the side surface of the optical waveguide (11, 21) is covered with the resin coating (12, 22); and the inorganic layer (14, 24) is arranged such that an NA of the optical waveguide (11, 21) in the coating-removed section (I0) is not less than the minimum value of an NA of the optical waveguide (11, 21) in the first coated section (I1).

According to the above arrangement, it is possible to prevent or reduce light leakage, from the optical waveguide (11, 21), which would occur in the coating-removed section (I0).

The optical fiber (1, 2) may be a single-clad fiber that includes: a core (11) made of quartz glass and serving as the optical waveguide (11); and a primary coating (12) made of resin and serving as the resin coating (12). Alternatively, the optical fiber (1, 2) may be a double-clad fiber that includes: a core (20) made of quartz glass; an inner cladding (21) made of quartz glass and serving as the optical waveguide (21); and an outer cladding (22) made of resin and serving as the resin coating (22).

According to any of the above arrangements, the foregoing effects are obtained.

A fiber laser including any of the foregoing optical fibers (1, 2) also falls within the scope of the present invention.

A fiber laser including any of the foregoing optical fibers (1, 2) also provides similar effects to that optical fiber (1, 2).

[Note]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 optical fiber
11 core (optical waveguide)
12 primary coating (resin coating)
13 secondary coating
14 inorganic layer
15 outer layer
P1 fusion splice point
G1 grating
2 optical fiber
20 core
21 cladding (optical waveguide)
22 primary coating (resin coating)
23 secondary coating
24 inorganic layer
25 outer layer
P2 fusion splice point
G2 grating
I0 coating-removed section
I1 first coated section
I2 second coated section

The invention claimed is:

1. An optical fiber comprising:
an optical waveguide; and
a resin coating that:
is lower in refractive index than the optical waveguide; and
covers a side surface of the optical waveguide except a coating-removed section of the side surface, wherein
the coating-removed section is covered throughout with an inorganic layer that is lower in refractive index than the optical waveguide, and
the inorganic layer is covered by an outer layer that is higher in thermal conductivity than the resin coating.

2. The optical fiber according to claim 1, further comprising:
an outer jacket that covers a side surface of the resin coating,
wherein the outer layer is higher in thermal conductivity than the outer jacket.

3. The optical fiber according to claim 1, wherein the inorganic layer is a particle layer comprising inorganic particles.

4. The optical fiber according to claim 3, wherein a particle diameter of the inorganic particles is smaller than a wavelength of light that is guided through the optical waveguide.

5. The optical fiber according to claim 1, wherein
the coating-removed section borders on two coated sections of the optical fiber including a first coated section in which the side surface of the optical waveguide is covered with the resin coating, and
the inorganic layer is disposed such that a numerical aperture (NA) of the optical waveguide in the coating-removed section is equal to or greater than the minimum value of an NA of the optical waveguide in the first coated section.

6. The optical fiber according to claim 1, wherein the optical fiber is a single-clad fiber that includes:
a quartz glass core as the optical waveguide; and
the resin coating as a primary coating.

7. The optical fiber according to claim 1, wherein the optical fiber is a double-clad fiber that includes:
a quartz glass core;
a quartz glass inner cladding as the optical waveguide; and
the resin coating as an outer cladding.

8. The optical fiber according to claim 1, wherein the optical fiber is disposed in a fiber laser.

9. An optical fiber comprising:
an optical waveguide;
a resin coating that:
- is lower in refractive index than the optical waveguide; and
- covers a side surface of the optical waveguide except a coating-removed section of the side surface; and an outer jacket that covers a side surface of the resin coating, wherein
the coating-removed section is covered throughout with an inorganic layer that is lower in refractive index than the optical waveguide, and
the inorganic layer is covered by an outer layer that is higher in thermal conductivity than the outer jacket.

10. The optical fiber according to claim 9, wherein the inorganic layer is a particle layer comprising inorganic particles.

11. The optical fiber according to claim 10, wherein a particle diameter of the inorganic particles is smaller than a wavelength of light that is guided through the optical waveguide.

12. The optical fiber according to claim 9, wherein
the coating-removed section borders on two coated sections of the optical fiber including a first coated section in which the side surface of the optical waveguide is covered with the resin coating, and
the inorganic layer is disposed such that a numerical aperture (NA) of the optical waveguide in the coating-removed section is equal to or greater than the minimum value of an NA of the optical waveguide in the first coated section.

13. An optical fiber comprising:
an optical waveguide; and
a resin coating that:
- is lower in refractive index than the optical waveguide; and
- covers a side surface of the optical waveguide except a coating-removed section of the side surface, wherein the coating-removed section is covered throughout with an inorganic layer that is lower in refractive index than the optical waveguide, and
the inorganic layer is a particle layer comprising inorganic particles.

14. The optical fiber according to claim 13, wherein a particle diameter of the inorganic particles is smaller than a wavelength of light that is guided through the optical waveguide.

15. The optical fiber according to claim 13, wherein
the coating-removed section borders on two coated sections of the optical fiber including a first coated section in which the side surface of the optical waveguide is covered with the resin coating, and
the inorganic layer is disposed such that a numerical aperture (NA) of the optical waveguide in the coating-removed section is equal to or greater than the minimum value of an NA of the optical waveguide in the first coated section.

16. An optical fiber comprising:
an optical waveguide; and
a resin coating that:
- is lower in refractive index than the optical waveguide; and
- covers a side surface of the optical waveguide except a coating-removed section of the side surface, wherein the coating-removed section is covered throughout with an inorganic layer that is lower in refractive index than the optical waveguide, and
the coating-removed section borders on two coated sections of the optical fiber including a first coated section in which the side surface of the optical waveguide is covered with the resin coating, and
the inorganic layer is disposed such that a numerical aperture (NA) of the optical waveguide in the coating-removed section is equal to or greater than the minimum value of an NA of the optical waveguide in the first coated section.

17. The optical fiber according to claim 16, wherein
the inorganic layer is a particle layer comprising inorganic particles, and
a particle diameter of the inorganic particles is smaller than a wavelength of light that is guided through the optical waveguide.

* * * * *